(12) United States Patent
Ennadi

(10) Patent No.: US 8,102,366 B2
(45) Date of Patent: Jan. 24, 2012

(54) UNIVERSAL TOUCH SCREEN KEYBOARD

(76) Inventor: Abderrahim Ennadi, Gauchy (FR)

( * ) Notice: Subject to any disclaimer, the term of this patent is extended or adjusted under 35 U.S.C. 154(b) by 767 days.

(21) Appl. No.: 12/089,712

(22) PCT Filed: May 9, 2006

(86) PCT No.: PCT/FR2006/001025
§ 371 (c)(1),
(2), (4) Date: Jun. 1, 2008

(87) PCT Pub. No.: WO2007/042629
PCT Pub. Date: Apr. 19, 2007

(65) Prior Publication Data
US 2008/0225006 A1   Sep. 18, 2008

(30) Foreign Application Priority Data

Oct. 11, 2005  (FR) ..................................... 05 10346

(51) Int. Cl.
*G09G 5/00*  (2006.01)
(52) U.S. Cl. ......... 345/156; 345/172; 345/173; 715/773
(58) Field of Classification Search .................. 345/156, 345/168–173
See application file for complete search history.

(56) References Cited

U.S. PATENT DOCUMENTS

| | | | |
|---|---|---|---|
| 4,725,694 A | 2/1988 | Auer et al. | |
| 5,847,698 A * | 12/1998 | Reavey et al. | 345/173 |
| 5,848,231 A | 12/1998 | Teitelbaum et al. | |
| 6,208,331 B1 * | 3/2001 | Singh et al. | 345/173 |
| 6,295,372 B1 * | 9/2001 | Hawkins et al. | 382/187 |
| 6,724,370 B2 * | 4/2004 | Dutta et al. | 345/169 |
| 7,460,893 B2 * | 12/2008 | Aarras | 455/575.3 |
| 7,869,834 B2 * | 1/2011 | Seol et al. | 455/566 |
| 2002/0039426 A1 | 4/2002 | Takemoto et al. | |
| 2004/0239637 A1 | 12/2004 | Williams et al. | |
| 2005/0024341 A1 * | 2/2005 | Gillespie et al. | 345/173 |
| 2005/0036814 A1 * | 2/2005 | Sim | 400/472 |
| 2005/0122313 A1 | 6/2005 | Ashby | |

FOREIGN PATENT DOCUMENTS

| | | |
|---|---|---|
| DE | 10105312 A1 | 1/2002 |
| EP | 0 246 021 A2 | 11/1987 |
| EP | 0 277 609 A2 | 8/1988 |
| EP | 1486858 A2 | 12/2004 |
| FR | 2 867 578 A | 9/2005 |
| JP | 62-274327 | 11/1987 |
| JP | 05-019935 | 1/1993 |
| JP | 10-027053 | 1/1998 |
| JP | 2002-151986 A1 | 5/2002 |
| JP | 2002-159052 A | 5/2002 |
| JP | 2003-061139 | 2/2003 |

(Continued)

OTHER PUBLICATIONS

English translation of Japanese Office Action dated May 31, 2011—Patent Application No. 2008-535052.
Japanese Office Action dated May 31, 2011—Patent Application No. 2008-535052.

(Continued)

*Primary Examiner* — Duc Dinh
(74) *Attorney, Agent, or Firm* — Young & Thompson

(57) ABSTRACT

The invention relates to a touch screen keyboard, characterized in that it comprises a screen with a tactile faceplate (1), luminous, with color display, and capable of displaying a basic standard keyboard and keys for rapid access to functionalities that can be displayed on the said tactile faceplate screen via respective interfaces.

13 Claims, 2 Drawing Sheets

FOREIGN PATENT DOCUMENTS

| | | |
|---|---|---|
| JP | 2003-296022 | 10/2003 |
| JP | 2004-355614 | 12/2004 |
| WO | 90/08372 A | 7/1990 |
| WO | 2004053673 A2 | 6/2004 |

OTHER PUBLICATIONS

Translation of Eurasian Office Action, Application No. 200801067/31, dated Apr. 11, 2011.

* cited by examiner

UNIVERSAL TOUCH SCREEN KEYBOARD

The present invention relates to a keyboard for a computer (laptop or desktop) with a multifunction touch screen making it possible to use the computer in a usual, agreeable and hygienic manner.

The current standard mechanical keyboard routinely used in all the industrial or residential fields requiring a computer is a conventional keyboard with noisy keys despite many ergonomic enhancements.

The gap between the keys is a veritable gathering point for germs and microbes of all kinds that are very difficult to dislodge. This poses a serious problem in all sterile locations (white rooms, hospital locations, etc.) where the use of computers is often disallowed or restricted to the minimum, and in places open to the public where computers are used by several people (Internet cafés, self-service terminals, etc.).

The current standard mechanical keyboard is fully programmed and configured at the factory, and defines the position of each key or function with no possibility of modification. Thus an AZERTY keyboard cannot be converted to a QWERTY keyboard; the keyboard must be completely replaced. The same applies if a user wants to work with languages other than the Latin languages. Each language with special characters (Russian, Arabic, Chinese, etc.) has its own keyboard, hence the person who works in several languages has to possess the same number of keyboards.

The current standard mechanical keyboard is extremely limited in functionalities. When it was required to add a new function such as direct Internet access for example, it was necessary to add a new key. These key additions will be restricted, in the more or less long-term, by the size of the keyboard itself.

The standard mechanical keyboard used today poses another problem: it is impossible to use it in a dark unlit room, because the keys become impossible to read.

The current standard usual mechanical keyboard has one and only one function: to allow us to type figures, letters and symbols on our computer.

The keyboard according to the invention makes it possible to remedy all the disadvantages listed above, and even adds new functionalities. Specifically it comprises, according to a first feature, a screen with tactile faceplate that is light and strong, luminous, in colour, has good resolution, on which the standard basic keyboard is displayed, with no numeric keyboard, and the shortcut keys to the other functionalities (mouse, numeric keypad, calculator, graphics tablet, direct access to certain programs, etc.). This list of functionalities is not comprehensive and may be increased according to the new techniques and accessories to come in the future in this field.

In other words, the proposal according to one aspect of the invention is a touch screen keyboard comprising a screen with a tactile faceplate, that is luminous, with colour display, and capable of displaying a basic standard keyboard, and keys for rapid access to functionalities that can be displayed on the said tactile faceplate screen via respective interfaces.

Advantageously, the functionalities comprise a mouse function, and/or a numeric pad function, and/or a calculator function, and/or a graphics tablet function, and/or an onboard software program in the computer to which the keyboard is dedicated, and/or a telephone function.

Naturally, any other functionality may be envisaged in a non-limiting manner,

The absence of relief due to the absence of mechanical keys makes it silent during its use, but it may also be programmed for sound on each key ("key beep" with higher or lower volume, or melody).

In other words, a key is suitable for being programmed for "sound on" or "sound off" during its use.

This absence of relief, and the materials used, make this keyboard a hygienic keyboard. The nests for microbes no longer exist and cleaning is made extremely easy: a simple babywipe is sufficient.

Since the screen used in this keyboard is a good resolution luminous screen, the user may use it in all rooms where the light is poor, and where it is normally impossible to use a computer without an external light source.

In addition to the usual conventional keyboard function, this touch screen keyboard comprises other functions that conventional mechanical keyboards do not have (graphics tablet, mouse, telephone, etc. function), that are fully programmable at will according to the specific needs of the user.

Also, according to one embodiment, the said interfaces are fully programmable by the user to suit his requirements.

Advantageously, the touch screen keyboard is capable of displaying an AZERTY, QWERTY, Latin or Cyrillic keyboard or another keyboard with special characters, and comprising means for changing from one keyboard to another, without switching off the computer to which the said keyboard is connected.

Thus it is easy to work in several different languages on one and the same document.

According to one embodiment, the touch screen keyboard comprises a security key allowing the user to lock his keyboard to clean it.

Advantageously the touch screen keyboard comprises a zone for reading and recognizing a fingerprint.

According to particular embodiments:
  the touch screen keyboard can be incorporated directly into a laptop computer, in which case it is the computer battery that will supply it for its correct operation
  the touch screen keyboard resembles in its general shape only, a usual mechanical keyboard and is connected to the desktop computer via a cable which makes it possible not only to transfer data but also provide its power supply.
  the touch screen keyboard resembles in its overall shape only, a usual mechanical keyboard and is connected to the desktop computer by means of a remote Bluetooth or infrared connection in which case a small battery, which is charged via a mains supply, supplies it with power.
  the touch screen keyboard comprises one or more USB points firewall etc. making it possible to connect removable disks, cameras, etc. directly to the keyboard.

The appended drawings illustrate the invention in a non-limiting manner:

Figure 1:
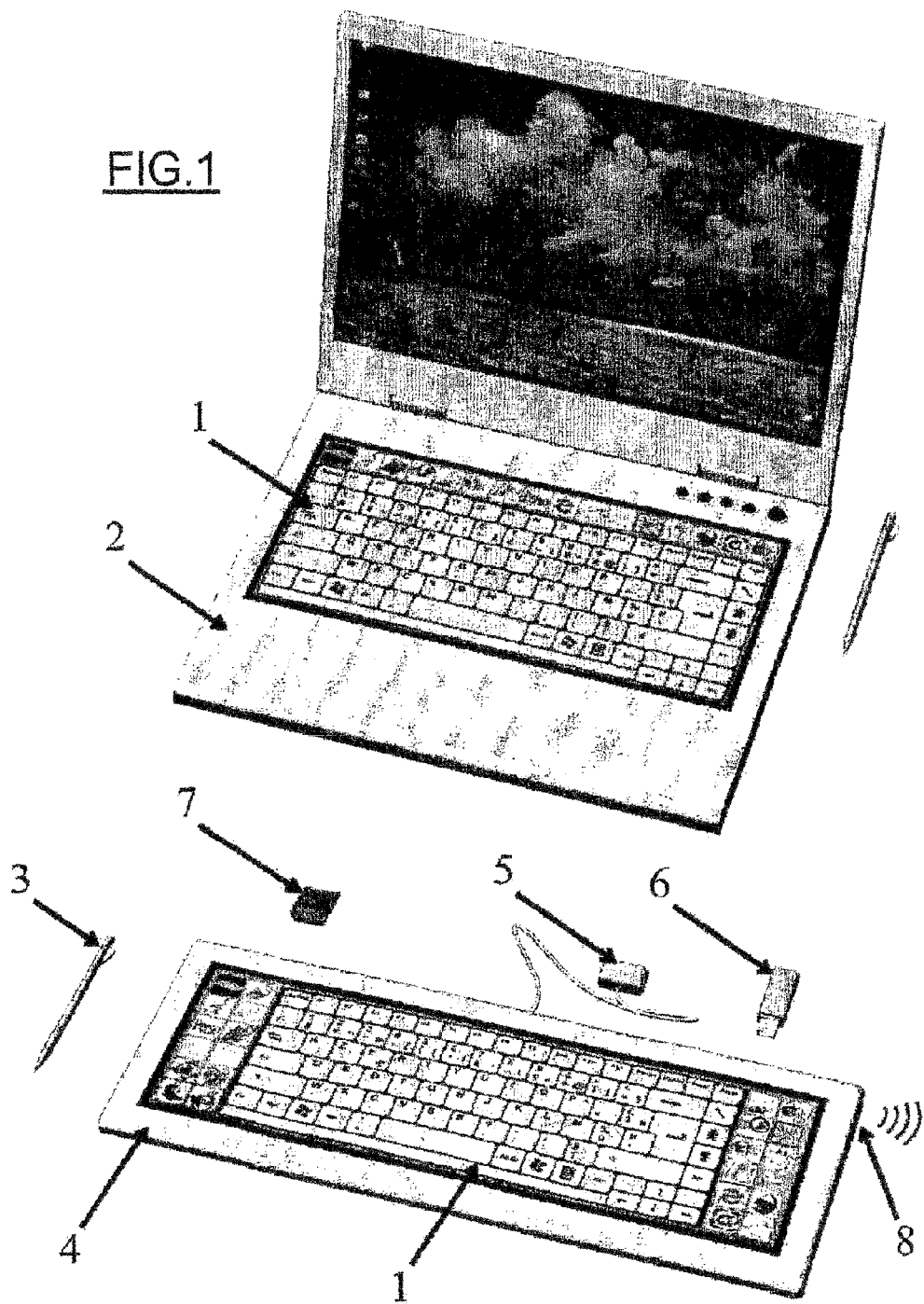
FIG. 1 represents in a general view, the touch screen keyboard in its two versions: incorporated into a laptop and in standard version, with its accessories.
Figure 2:
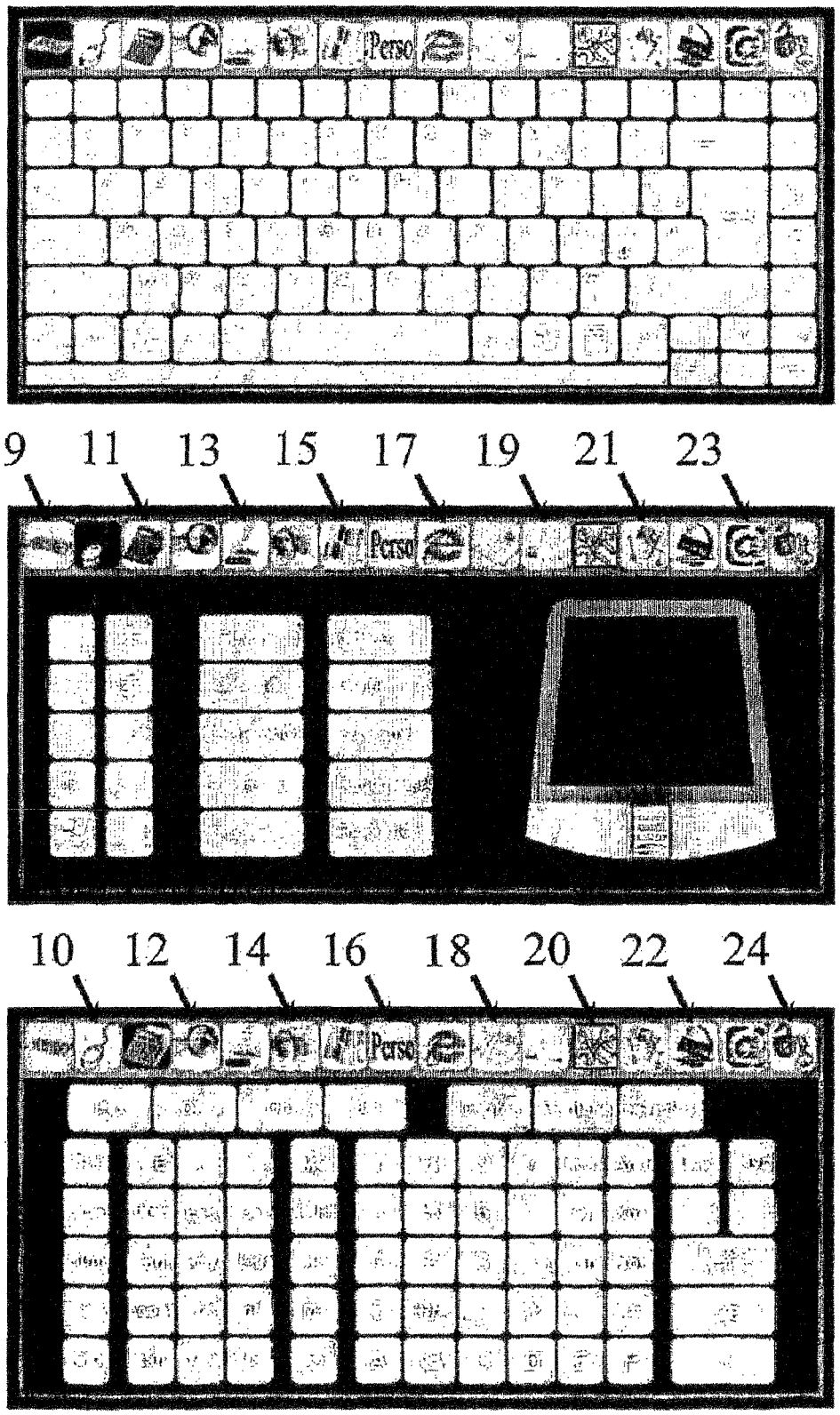
FIG. 2 represents, in a front view, in a non-limiting manner, some of the interfaces of the touch screen keyboard: keyboard, mouse, calculator, but other interfaces are and will be able to be produced.

With reference to these drawings, the touch screen keyboard, in its integratable version consists of a touch screen 1 mounted directly at the factory onto a laptop computer 2, instead of the standard mechanical keyboard.

The standard touch screen keyboard consists of a touch screen 1 housed in a standard keyboard base 4 as a replacement of the mechanical keys currently used. The keyboard base 4 may incorporate USB ports to allow the direct connection to the keyboard, of a USB key 6 or a mouser etc., SD card readers 7, one or more sound inputs/outputs, an integrated microphone, and a housing for the stylus 3 mainly used with the graphics tablet. Other accessories may be envisaged depending on the needs of the market and the technological advances to come.

The standard touch screen keyboard 1, 4 is connected to the central processor unit by means of a specific hook-up or connector 5 that serves for both power supply and data transfer. This connector 5 may be mounted either directly on the mother board of the computer or on a special board mounted on a PCI port or any other new port specially designed for this purpose on the mother board, or directly on the computer graphics card, modified accordingly. This touch screen keyboard may also be connected to the central processor unit via a remote Bluetooth connection, WI-FI, etc. 8 in which case it will be supplied separately directly from the mains supply or from a rechargeable battery.

The interfaces of the touch screen keyboard may be driven by a software program designed in parallel with the keyboard, and may be many and varied, adaptable to the needs of each user.

In a non-limiting manner, the keyboard interface, the main interface of the touch screen keyboard, includes shortcut keys for direct access to the other interfaces. When the interface is active, the corresponding key changes colour, thus indicating to the user the interface currently being used.

It is also possible to enumerate, amongst others, the keyboard key 9 activating the main keyboard interface, the mouse key 10 activating the mouse interface with its "copy", "paste", "cut", "open", "Find", etc. functions, functions that are identical to those of a conventional normal three-button mouse.

The key 11 makes it possible to access the calculator unction, that may be programmed as a standard basic or scientific calculator depending on the needs of the user.

Certain shortcut keys are left free so as to allow the user to program them according to his needs. They may therefore be converted into keys for direct access to certain applications, such as "Photoshop (registered trademark)" 12, "Quark (registered trademark)" 13, "Illustrator (registered trademark)" 14, then displaying all the tools used in this application, even to all the "Microsoft (registered trademark)" applications present on the computer 15, but may be dedicated to other applications according to the needs of each user.

The PERSO key 16 present on the keyboard may be customized also and may then display the user's customized keyboard (changing the place of letters, alphabetic order, special characters, etc.).

Other keys allow direct access to certain usual functionalities of the computer. Thus, there is an Explorer key 17, for direct access to the Internet, a telephone key 18, which, associated with a telephone headset, displays the interface of a telephone that may be used like a standard conventional telephone, but that also offers the possibility of connecting to a company telephone installation terminal.

The Graphics Tablet key 19, an essential complement of many graphics and 2D programs, also allows recognition of manuscript characters for rapid writing, even the insertion of the manuscript signature at the bottom of documents sent by email.

The Setup or Tools key 20 allows the user to configure all the parameters of his keyboard directly on the keyboard without going via the computer. This configuration is nevertheless available from the software on the computer.

The Languages key 21 provides a new functionality, since it is possible to switch over directly from a Latin keyboard, to a Chinese keyboard, then to a Russian keyboard, etc., without having to switch the computer off and connect a new keyboard.

The Multimedia key 22 gives direct access to the adjustment of the sound, video equalizers, and why not to a small virtual piano, even a video/audio mixing console, to be used with the appropriate software.

The email key 23 will allow the user, after having programmed it, to gain direct access to his email via "Outlook" (registered trademark) or via other messaging software programs.

The Security key 24 allows the user to lock his keyboard to clean it. However, with the inclusion of a fingerprint reading zone, it is possible to identify the user and thus protect the computer to the maximum. Similarly, a print recognition software program may be included in the configuration software accompanying the touch screen keyboard, in order to protect the folders on the hard disk.

Other keys and functionalities may also be incorporated into this keyboard in the future, with no limits, and this can be done according to the requirements and technological advances in the field.

As a nonlimiting example, the integratable touch screen keyboard will have dimensions of the order of 30 cm for the length and 15 cm for the width, and the standard touch screen keyboard will have dimensions of the order of 40 cm for the length and 14 cm for the width. These dimensions may however be suited to each hardware configuration present on the market and on which it has to be installed, and to the specific needs of the clients.

The touch screen keyboard according to the invention fills the gap between conventional information technology (the machine universe) and the natural ways of working (the human universe), since it incorporates many functionalities allowing the user to use his computer as easily as a piece of paper. The user may specifically take his notes by hand, directly on his computer with automatic retranscription, sign his email documents to approve them and carry out many other things with disconcerting ease.

The touch screen keyboard according to the invention, through the multiple functions that it offers, allows easier and quicker working for the laptop user who no longer needs to carry a mouse, graphics tablet, numeric keypad, etc., his computer now combining all his functions in a single machine.

The touch screen keyboard according to the invention, through its ability to be fully programmable according to the needs of each user, is applicable to all people using a computer routinely, at both the personal and professional level.

The invention claimed is:

1. A laptop computer comprising:
a microprocessor;
a hard drive for registering data;
a memory means;
a display screen adapted to display an interface; and
a touch screen keyboard comprising a screen with a tactile faceplate, said touch screen keyboard programmed to display and receive input of:
a mouse interface receiving input of a mouse and performing functions associated with the input of the mouse;
a telephone interface receiving input of a telephone and performing a function associated with the input of the telephone;
an email interface receiving input of an email application and performing a function associated with the input of the email application;

a Graphic Tablet interface receiving input of an Graphic Tablet application and performing a function associated with the input of the Graphic Tablet application; and a main interface, said main interface displaying a plurality of shortcut keys for selectively receiving input of a shortcut key of the plurality of shortcut keys, activating one of the mouse interface, the telephone interface, the email interface and the Graphic Tablet interface associated with the shortcut key.

2. The laptop computer according to claim 1, wherein upon one of the said interfaces of the touch screen keyboard being active, the corresponding shortcut key changes color, indicating to the user that this interface is active.

3. The laptop computer according to claim 1, in which the keys of the touch screen keyboard are suitable for being programmed for "sound on" or "sound off".

4. The laptop computer according to claim 1, in which the keyboard is capable of displaying an AZERTY, QWERTY, Latin or Cyrillic keyboard or another keyboard with special characters, and comprising means for changing from one keyboard to another, without switching off the computer to which the said keyboard is connected.

5. The laptop computer according to claim 1, in which the Graphic Tablet displayed, can be used with a stylus and which allows recognition of manuscript characters.

6. The laptop computer according to claim 1, in which the main interface includes keys for direct access to at least one application and displaying all the tools used in this at least one application.

7. The laptop computer according to claim 1, in which the main interface comprises a PERSO key which displays a keyboard customized by the user.

8. The laptop computer according to claim 1, in which the interfaces of the touch screen are driven by a distinct software program.

9. The laptop computer according to claim 1, in which the shortcut keys of the main interface comprise a Multimedia key which gives access to the adjustment of the sound or a video equalizer or a small virtual piano or a video/audio mixing console.

10. The laptop computer according to claim 1, in which the shortcut keys of the main interface comprise an email key which gives access to the email of the user.

11. The laptop computer according to claim 1, in which the shortcut keys of the main interface comprise a Security keys which locks the keyboard.

12. The laptop computer according to claim 1, wherein the touch screen keyboard is suitable for being supplied directly via the laptop battery or via the computer power supply, or separately from the mains supply or via a rechargeable battery.

13. A computer system comprising:
a first display panel displaying information of the computer system;
a second display panel with a tactile faceplate hingedly attached to said first display panel;
a processor programmed to display and receive input from said second display panel and display information on said first display panel, said second panel displaying:
a first section with a plurality of shortcut keys;
a second section displaying an input function of a plurality of interfaces, an interface of the plurality of interfaces activated upon receiving input of an associated shortcut key of the plurality of shortcut keys; and
upon the second section of the second panel receiving input of a interface of the plurality of interfaces a corresponding function associated with said input is performed by the computer system and displayed on said first display panel,
wherein the plurality of interfaces in the second section of said second display panel comprises a keyboard, a mouse, a Graphics Tablet, a telephone and an email application.

* * * * *